United States Patent [19]

Dorman

[11] Patent Number: 4,555,757
[45] Date of Patent: Nov. 26, 1985

[54] INTERFACE SYSTEM FOR HYBRID CONTROL LOOPS

[75] Inventor: William J. Dorman, Ellicott City, Md.

[73] Assignee: Westinghouse Electric Corp., Pittsburgh, Pa.

[21] Appl. No.: 492,061

[22] Filed: May 5, 1983

[51] Int. Cl.[4] .............................................. G05B 11/00
[52] U.S. Cl. .................................. 364/165; 318/632; 364/166; 364/176; 364/454
[58] Field of Search ............... 364/164, 165, 166, 170, 364/171, 453, 426, 454, 566, 176, 177; 318/561, 632; 73/504; 74/5.4

[56] References Cited

U.S. PATENT DOCUMENTS

| | | | |
|---|---|---|---|
| 3,221,230 | 11/1965 | Osburn | 364/165 X |
| 3,758,762 | 9/1973 | Littman et al. | 364/165 |
| 4,005,608 | 2/1977 | Lanni et al. | 364/453 X |
| 4,021,716 | 5/1977 | Rue | 364/176 X |
| 4,069,413 | 1/1978 | Rutledge et al. | 364/164 |
| 4,257,105 | 3/1981 | Stewart et al. | 364/165 X |

Primary Examiner—Joseph Ruggiero
Attorney, Agent, or Firm—W. E. Zitelli

[57] ABSTRACT

A system for interfacing a digital computer with an analog gimbal control loop rate integrating gyro for controlling the movement of inner and outer gimbaled elements is disclosed. The purpose of the interface system is to permit an increase in the agility of the analog control loop without imposing unreasonable data rate requirements on the digital computer. In operation, the digital computer generates a rate command signal which is stepwise updated at designated time intervals and provided to the analog gimbal control loop to govern the rate output thereof. The interface system, which includes an element for filtering the rate command signal which governs the analog gimbal control loop, an element for generating a feed-forward aiding signal as a function of the rate of change of the filtered rate command signal to further govern the analog gimbal control loop, and an element for compensating the rate command signal for the operation of the filtering process to render the average rate output of the analog gimbal control loop during the time intervals between computer rate command signal updates to be substantially that desired.

10 Claims, 4 Drawing Figures (BACKGROUND)

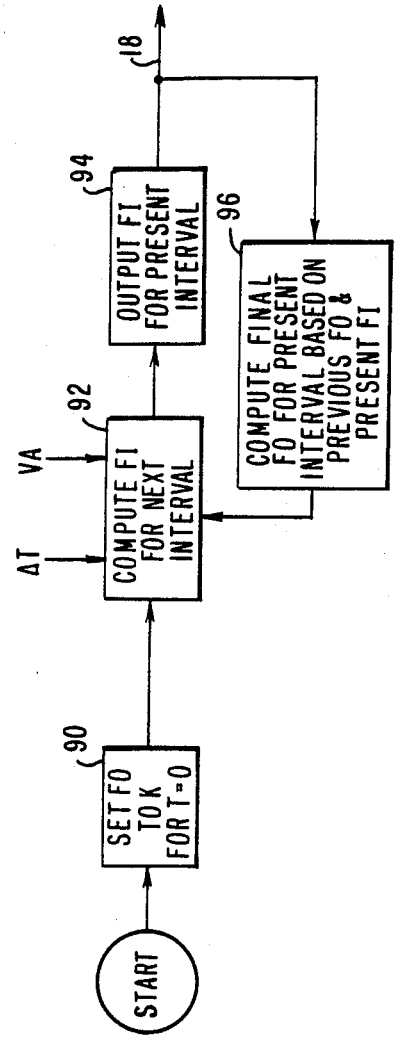
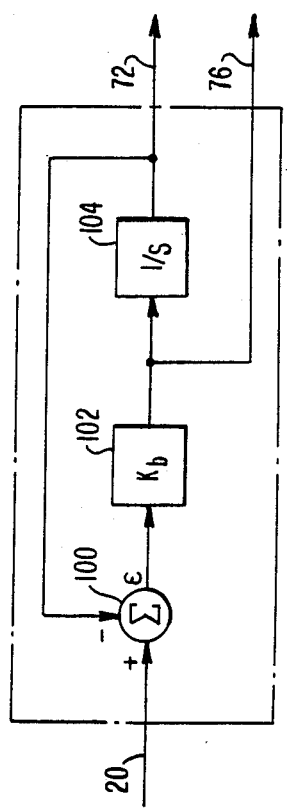

INTERFACE SYSTEM FOR HYBRID CONTROL LOOPS

GOVERNMENT CONTRACT CLAUSE

The Government has rights in this invention pursuant to Contract No. F33615-78-C-3022 awarded by the Department of the Air Force.

BACKGROUND OF THE INVENTION

This invention relates generally to analog/digital hybrid control loops, and more specifically, to a system for interfacing a digital computer with at least one analog control loop to increase the agility of the analog loop without imposing unreasonable data rate requirements on the computer.

A representative analog/digital hybrid control loop is shown in the functional block diagram schematic of FIG. 1. This particular control loop includes a rate-integrating gyro within a gimbaled system for controlling a first or inner gimbaled element and a second or outer gimbaled element. While the schematic diagram illustrates the control of motion in only one dimension, like the azimuth or elevation dimension, for example, it is understood that the digital computer may control other dimensions of the gimbaled system in a similar manner.

Referring to FIG. 1, a digital computer 12 is operative as an angular position controller by setting a desired angular position $\theta_s$ for the gimbaled system and subtracting therefrom in the summer 14 the measured angular position $\theta_f$ of the gimbaled system 10. The resulting positional error $\theta_\epsilon$ is operated on by a conventional proportional plus integral (P+I) controller 16 to generate a rate command signal 18 which is provided to the gimbaled system 10 via a conventional digital-to-analog converter (D/A). The analog rate command signal 20 may be provided to a rate-integrating gyro and driving circuits 22. More specifically, the analog signal 20 governs the gyro precession rate (i.e., rotation of the spin axis of the gyro) by gyro torquing circuits 24 and causes the first or inner gimbaled element to move at the same angular rate therewith. The angular rate of the gyro/inner gimbaled element is denoted functionally by the signal $\theta_{GY}$ provided to the functional summer 26.

A gimbal torque motor, denoted by the block 28, may be powered by an amplifier 30 to drive a second or outer gimbaled element coupled thereto at an angular rate which is functionally denoted by the signal line $\theta_{LOS}$ also provided to the summer 26 to be functionally subtracted from the angular rate of the inner gimbaled element in the gyro unit 22. A functional signal 32 representative of the angular rate difference thereof is functionally integrated and monitored by a sensor element 34 of the gyro unit 22 to effect the positional difference or displacement between the inner and outer gimbaled elements during movement thereof. An angular displacement signal 36 may be generated by the sensor 34 and provided to a number of signal conditioning circuits 38 for various functional operations like demodulation and filtering, for example. A resulting conditioned angular displacement signal 40 may be passed through conventional compensation networks 42 and 44 to govern the angular rate movement of the outer gimbaled element via power amplifier 30 and torque motor 28. In the present example, the angular position of the outer gimbaled element is used as the positional control element for the digital computer 12. For this case, a functional integration of the angular rate $\theta_{LOS}$ may be accomplished by a conventional instrument 48, like a synchro, for example, to effect a positional signal 50 which is digitized by a conventional analog-to-digital converter (A/D) and provided to the functional summer 14 via digital computer 12.

In operation, the computer 12 may govern the movement of the outer gimbaled element to a new position by changing the set point $\theta_s$ of its positional loop. Upon changing the set point $\theta_s$, an error $\theta_\epsilon$ is created and is operated on by the P+I controller 16 to produce a rate command signal 18 which is passed to the gyro torquer 24 via D/A converter. An angular rate is caused to occur in the gyro/first gimbaled element which is sensed as an angular rate difference 32 by the gyro unit 22. The gyro sensor 34 integrates the angular rate difference to effect a signal 36 representative of the angular displacement between the first and second gimbaled elements. The signal 36 is utilized to drive the torque motor 28 to cause the second gimbaled element to follow the first gimbaled element at the desired angular rate thereof. As the position of the second gimbaled element approaches its desired position, the positional error $\theta_\epsilon$ converges to zero, causing the rate command signal to stabilize. The angular rate control loop maintains the desired angular position until a new angular position is effected by the digital computer 12.

One drawback of analog/digital hybrid control loops of this variety is that the computer is a quasi-synchronous machine and thus updates the rate command signal stepwise at designated time intervals. Because of the stepwise manner of generation of the rate command signal, the analog control loop may become saturated by abrupt and frequent changes in the rate command signal governing it. More specifically, as the rate command signal from the computer changes abruptly, the spin axis of the gyro or inner gimbaled element quickly begins rotating at a newly commanded rate $\theta_{GY}$. The resulting loop error signal 32 eventually creates an acceleration signal to produce the desired rate change in the second gimbaled element. However, before that can happen, the error signal 32 may become so large as to produce saturation within the rate stabilization loop. The reason for this is that the loop is made very "stiff", in order to provide good outer gimbaled element stabilization in spite of such things as torque disturbances caused by gimbaled element friction, cable torques, and the like. This high stiffness design may cause the torque demand to exceed the capability of the gimbal torque motor 28 when the position error or displacement 36 is still quite small.

To keep such saturation from causing instability of the loop 10, some torque motor analog control loops include a gyro saturation loop, like that shown at 54, for example. Such a saturation loop becomes operative when the torque limit or angular displacement between the first and second gimbaled elements exceed a predetermined level. In the present example, the saturation loop 54 includes a non-linear functional element 55 which has as an input the conditioned angular displacement signal 40 and an output which couples to a compensation network 58 to provide a signal 60 which is used to further govern the gyro torquer 24. The output signal 60 has no effect on the gyro unit 22 as long as the angular displacement signal 40 is within predetermined upper and lower limits 56 and 57, respectively, of the functional unit 55. Should the signal 40 exceed the displacement limits, the functional unit 55 governs the gyro torquer 24 via the compensation network 58 with a signal value in proportion to the amount of displacement exceeding the predetermined limit.

These type of saturation loops, like that shown at 54, for example, are needed to prevent instability when the stabilization loop becomes non-linear, because of torque limiting, for example. Unfortunately, the saturation loop 54 changes the gyro/inner gimbaled element position (i.e., during saturation) in a manner not in accordance with the computer generated rate command signal 20 and thus, corrupts the inertial reference for the second gimbaled element angular position. The present invention which is described hereinbelow intends to avoid such corruption of the reference position of the second gimbaled element during periods of rapid change in the desired gimbaled element rate, without sacrificing agility or accuracy of the actual rate.

It is apparent that the abruptness of rate command signal changes could be reduced by analog low-pass filtering of the computer generated rate command signal, but that would create a time lag in the analog control loop input and be counter-productive in terms of analog loop agility. For this reason, an analog filtering element in and of itself is counter to the purpose of increasing the agility of the analog control loop without imposing unreasonable data rate requirements on the computer. However, a carefully blended combination of elements including an analog filtering element may result in the preferred operation if the average loop output during the time interval between computer generated rate command signal updates may be controlled to be substantially that desired, even during periods of rapid change in the analog loop output.

SUMMARY OF THE INVENTION

In an analog/digital hybrid control loop, a computer is operative to provide a rate command signal to an analog gimbal control loop to govern the rate output thereof. The rate command signal is stepwise updated at time intervals designated by the computer to convert the rate output of the analog control loop to a desired rate. In accordance with the present invention, a system for interfacing the digital computer with at least one analog gimbal control loop comprises a means for filtering the rate command signal of the computer to provide a filtered rate command signal to the analog gimbal control loop, means for generating a feed-forward aiding signal as a function of the rate of change of the filtered rate command signal to further govern the analog gimbal control loop, and means for compensating the rate command signal for the operation of the filtering means to render the average rate output of the analog gimbal control loop during the time internvals between computer rate command signal updates to be substantially that desired.

More specifically, the filtering means comprises a single-pole, low-pass filter circuit coupled in the rate command signal line between the computer and analog control loop. The generating means comprises means for effecting a signal representative of the difference between the rate command signal and filtered rate command signal, the effected signal being used as the feed-forward aiding signal. Furthermore, the compensation means includes first means for computing a fixed rate command signal for the next time interval based on a function of the desired average rate output of the analog control loop during the next time interval, the next time interval duration, the effective time constant of the filtering means, and the final value of the filtered rate command signal for the present time interval; and second means for computing the final value of the filtered rate command signal for the present time interval based on a function of the fixed rate command signal for the present time interval, the present time interval duration, the final value of the filtered rate command signal for the previous time interval, and the effective time constant of the filtering means.

BRIEF DESCRIPTION OF THE DRAWINGS

FIG. 3 is a functional flow diagram of a compensation algorithm suitable for use in the embodiment of FIG. 2.

FIG. 4 is a functional block diagram schematic of an alternate filtering/aiding circuit suitable for use in the embodiment of FIG. 2.

DESCRIPTION OF THE PREFERRED EMBODIMENT

Figure 1:
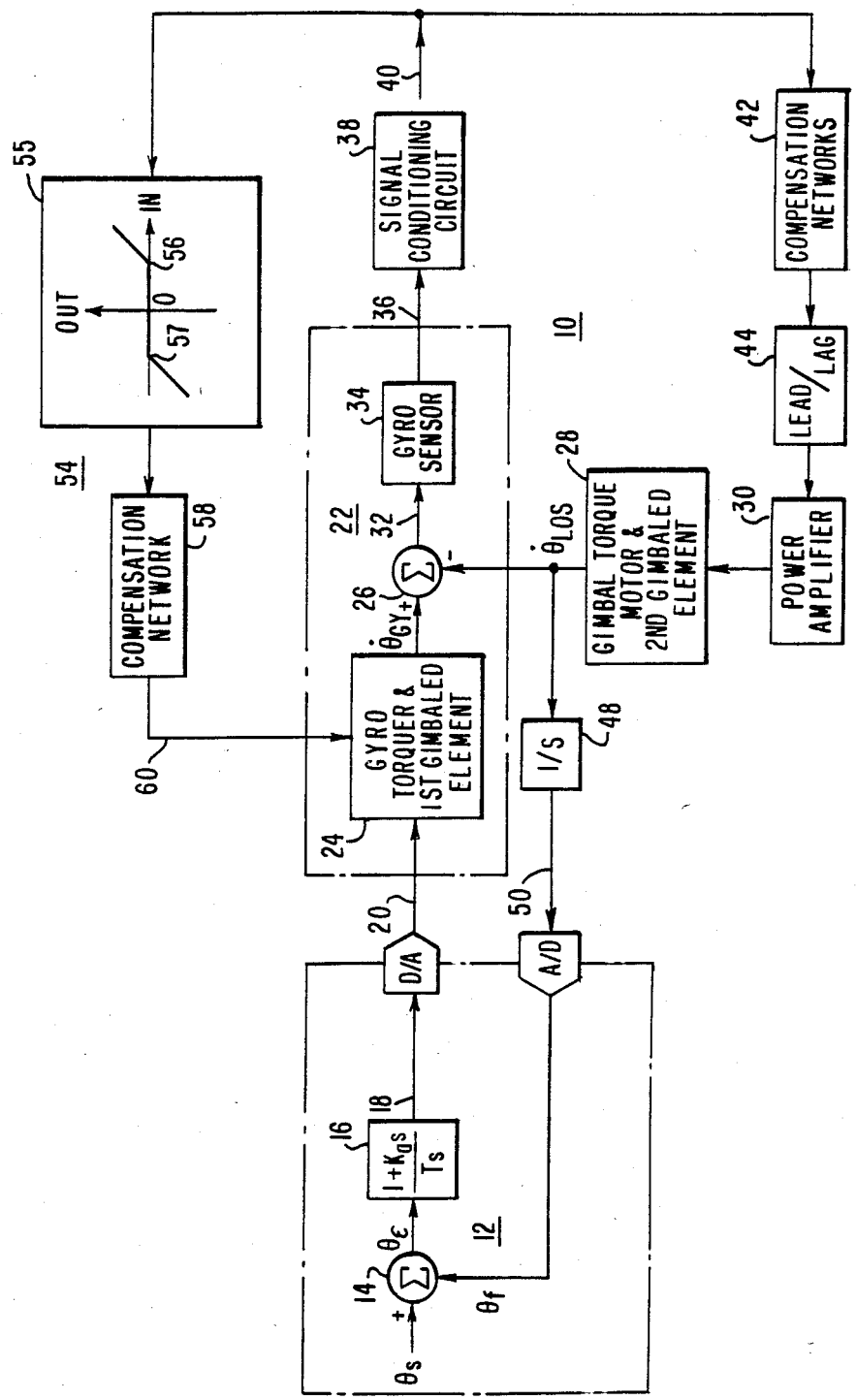
FIG. 1 is a functional block diagram schematic of a representative analog/digital hybrid control loop.
Figure 2:
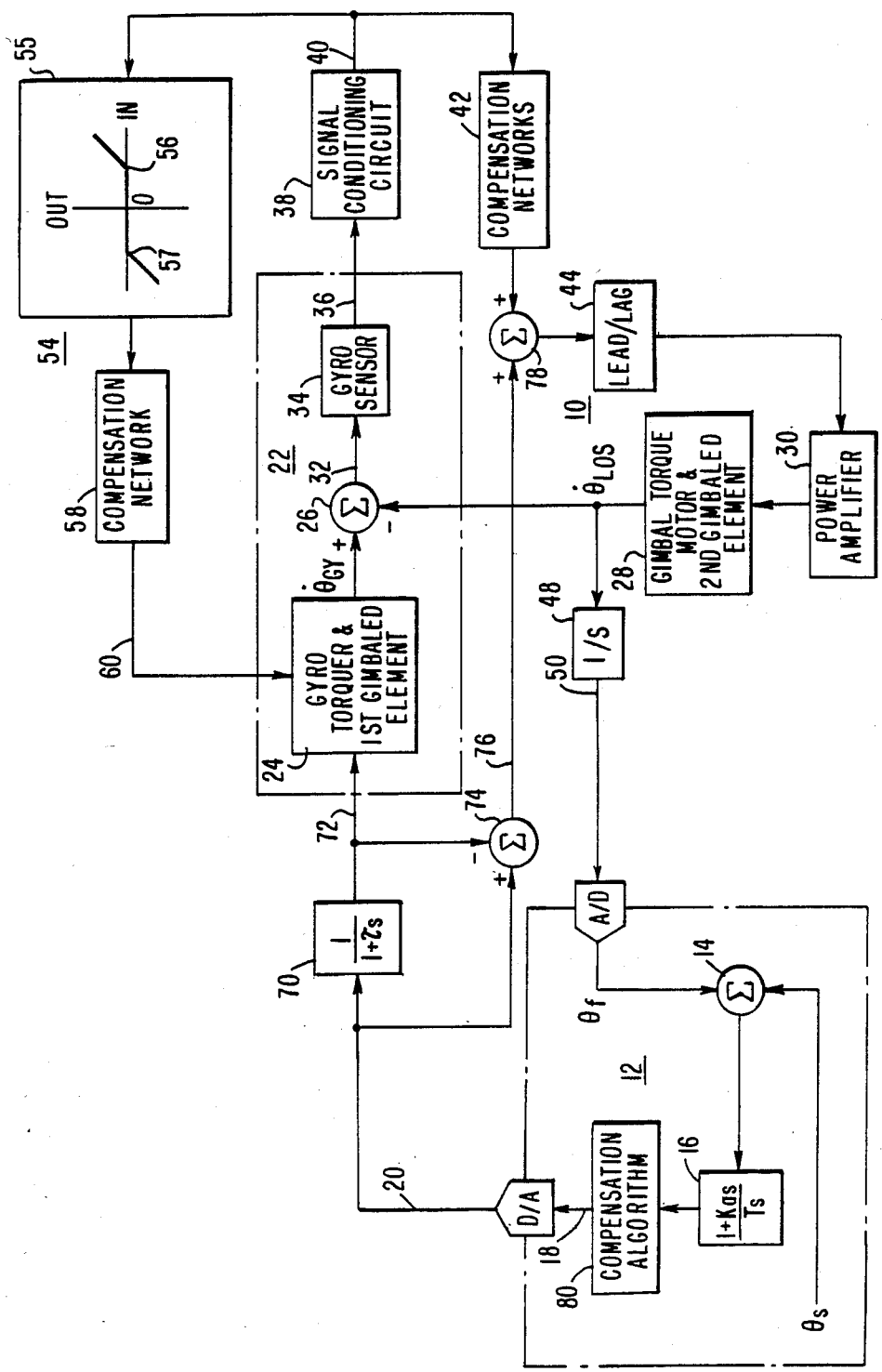
FIG. 2 is a functional schematic block diagram of an analog/digital gimbal control loop suitable for embodying the principles of the present invention.

A system for interfacing the digital computer 12 with at least one analog gimbal control loop 10 is depicted in the simplified functional block diagram schematic embodiment of FIG. 2. The embodiment of FIG. 2 includes an element 70 for filtering the rate command signal 20 of the computer 12 to provide a filtered rate command signal 72 to the analog gimbal control loop 10. Another element 74 is utilized for generating a feed-forward aiding signal 76 as a function of the rate of change of the filtered rate command signal 72 to further govern the analog gimbal control loop 10. In the present embodiment, the element 74 is a summer used to subtract the filtered rate command signal 72 from the computer generated rate command signal 20 to render the aiding signal 76 which is used as an acceleration aiding signal to further govern the torque motor 28. The signal 76 may be disposed in the signal line path to the torque motor 28 using a summer 78 which may be coupled between the compensation networks 42 and 44. It is understood that the acceleration aiding signal 76 may be disposed at a variety of places in the signal path governing the torque motor 28 to suit the purposes of the designer without deviating from the broad principles of the present invention.

A third element as part of the interfacing system combination may be a compensation algorithm 80 included in the digital computer 12 for compensating the rate command signal 18 for the operation of the filtering element 70 to render the average rate output of the analog gimbal control loop, which may be for the present embodiment, $\theta_{LOS}$, during the time intervals between computer rate command signal updates to be substantially that desired.

In a typical operation, the rate command signal generated by the computer 12 may be passed through a simple low-pass filter 70 with unity DC gain and time constant $\tau$ and the resulting filtered rate command signal 72 may be provided to the gyro torquer 24 of the gyro unit 22. The signal 76 representative of the rate of change of the filtered rate command signal 72 may in response to a computer update of the rate command signal 20 increase stepwise to an initial value equal to the input rate step size divided by the time constant $\tau$. The rate of change of signal 76 may then begin an exponential decay with time constant $\tau$. Over the brief time intervals between computer updates of the rate command signal, the power amplifier/torque motor/second gimbaled element combination operates functionally very much like a signal integrator. Thus, the feed-forward signal 76 will be approximately integrated during each computer update interval to produce an angular rate of the second gimbaled element which closely resembles the angular rate of the gyro coupled gimbaled element. The integral of the angular rate difference, which has been kept small by the introduction of the acceleration aiding signal 76, is measured by the gyro sensor 34 of the gyro unit 22 and the residual error propagates through the stabilization loop, providing correction for imperfections of angular rate as governed by the feed-forward aiding operation. Accordingly, since the bulk of the angular displacement between the first and second gimbaled elements has been eliminated by the feed-forward acceleration aiding signal, the gyro saturation loop 54 will not become operative to corrupt the desired gyro angular rate.

The filtering/aiding functions described above are intended to solve the loop saturation drawback, provided the filter time constant $\tau$ is large enough to limit the rate of change of the filtered signal output 72 to within the capacity of the gimbal torque motor 28. The desired $\tau$ may first appear to be too large for compatibility with the preferred second gimbaled element agility. But, that is the reason for the compensation element 80 provided preferably in the programming of the digital computer 12 as will be described in greater detail hereinbelow.

As indicated hereabove, the function of the digital computer 12 is to create the desired angular rate $\theta_{LOS}$ for each dimension of the gimbaled element which it is controlling. More specifically, the goal is to create the correct average value of rate command signal provided to the gyro torquing circuits over each computer iteration interval. With the low-pass filter (LPF) 70 between the computer 12 and the gyro torquer 24, the computer 12 does more than simply output the desired average values of angular rate; rather, it additionally computes how the LPF signal output has changed in response to earlier LPF signal inputs, so that the correct new LPF inputs may be computed.

A functional block diagram of the compensation algorithm 80 suitable for use in the digital computer 12 is shown in FIG. 3. In operation, for an initial computer time interval starting at time T=0, for example, the filtered signal output FO may be set to a constant value which may be zero for the present example. The value of FO set by block 90 is representative of the value of the filtered signal output at the end of a previous time interval. In the block 92, a fixed rate command signal FI is computed for the next time interval based on a function of the desired average rate output VA of the analog control loop during the next time interval, the next time interval duration $\Delta T$, the effective time constant of the filtering element $\tau$, and the final value FO of the filtered rate command signal for the present time interval. This computation may be performed in accordance with the following mathematical exression:

$$FI = K1*VA + (1-K1)*FO, \quad (1)$$

where $$K1 = 1/(1-(1-EXP(-\Delta T/\tau))*\tau/\Delta T). \quad (2)$$

The computed value FI is output during its respective time interval, denoted as the present time interval, by the functional block 94. The value of the signal FI for the present interval is fed into another functional block 96 which computes the final value FO of the filtered rate command signal for the present time interval based on a function of the fixed rate command signal FI for the present time interval, the present time interval duration $\Delta T$, the final value FO of the filtered rate command signal for the previous time interval, and the effective time constant $\tau$ of the filtering element. More specifically, the final value FO may be computed in the functional block 96 in accordance with the following mathematical expression:

$$FO = FO*K2 + FI*(1-K2), \quad (3)$$

where $$K2 = EXP(-\Delta T/\tau). \quad (4)$$

It is understood that there is no requirement for the digital computer update interval $\Delta T$ to always be the same, however, the duration of the previous time interval should be known in order for the value FO at the end of that time interval to be computed before the end of the interval. Should the next time interval for updating be presently unknown, an estimate of the expected duration thereof will permit the timely computation of the next FI value. Compensation may be possible during a subsequent time interval if that estimate proves to be too inaccurate. In addition, although the value of K1 provided by equation (2) is the value which would provide exact compensation for the presence of the filtering element 70, it may produce oscillatory behavior in some cases. That problem can be solved by the use of a smaller value of K1, without sacrificing much of the desired compensation.

An alternate embodiment for the filtering/aiding signal functional combination is depicted by the block diagram schematic of FIG. 4. In this embodiment, the filtered signal 72 is fed back to be subtracted from the unfiltered signal 20 in a summer 100. The resulting error signal $\epsilon$ may be gain adjusted by the gain $K_b$ in the functional block 102. The resulting signal out of the functional block 102 may become the feed-forward aiding signal 76 which further governs the torque motor 28 of the analog control loop. The output of block 102 may also be supplied to an integrator 104 which ultimately produces the filtered signal 72. The combination of blocks 102 and 104 cascadedly perform the equivalent function of a low-pass single pole filter. Accordingly, the signal 76 is representative of the rate of change of the filtered signal 72.

Any errors caused by an imperfect implementation of the analog LPF have been considered. For example, gain errors have an affect on the analog loop, but are easily limited by the use of precision resistors. Time constant errors resulting from possible capacitor tolerances are more difficult to control with time and temperature and also when space limitations dictate the use of very small sized capacitors. The effect of these errors has been determined by experimentation for embodiments similar to the one described hereabove. The results of the experimentation indicate that the various embodiments are practical.

What is claimed is:

1. A system for interfacing a digital computer with at least one analog gimbal control loop, said computer being operative to provide a rate command signal to said analog gimbal control loop to govern the rate output of said analog control loop, said rate command signal being stepwise updated at time intervals designated by said computer to converge the rate output of said analog control loop to a desired rate, said interface system comprising:
   means for filtering said rate command signal of said computer to provide a filtered rate command signal to said analog gimbal control loop;
   means for generating a feed-forward aiding signal as a function of the rate of change of said filtered rate command signal to further govern said analog gimbal control loop; and
   means for compensating said rate command signal for the operation of said filtering means to render the average rate output of said analog gimbal control loop during the time intervals between computer rate command signal updates to be substantially that desired.

2. The interface system in accordance with claim 1 wherein the filtering means comprises a single-pole low-pass filter circuit coupled in the rate command signal line between the computer and analog control loop.

3. The interface system in accordance with claim 1 wherein the generating means comprises means for effecting a signal representative of the difference between the rate command signal and filtered rate command signal, said effected signal being used as the feed-forward aiding signal.

4. The interface system in accordance with claim 1 wherein the compensation means includes:
   first means for computing during a present time interval between rate command signal updates a fixed rate command signal for a next time interval between rate command signal updates based on a function of the desired average rate output of the analog control loop during the next time interval, the next time interval duration, the effective time constant of the filtering means, and the final value of the filtered rate command signal for the present time interval; and
   second means for computing the final value of the filtered rate command signal for the present time interval, the present time interval duration, the final value of the filtered rate command signal for a previous time interval between rate command signal updates, and the effective time constant of the filtering means.

5. A system for interfacing a digital computer with at least one analog control loop for controlling a gimbaled system including first and second gimbaled elements, said analog control loop including a first means for driving said first gimbaled element at an angular rate, and a second means for driving said second gimbaled element at an angular rate, said second means governed by a signal based on the difference in angular rates between said first and second gimbaled elements, said computer being operative to provide a rate command signal to said analog control loop, said rate command signal being stepwise updated at time intervals designated by said computer, said interface system comprising:
   means for filtering said rate command signal of said computer to provide a filtered rate command signal to said first driving means to govern the angular rate of said first gimbaled element;
   means for generating a feed-forward signal as a function of the rate of change of said filtered rate command signal and providing said feed-forward signal to said second driving means to further govern the angular rate of said second gimbaled element; and
   means for compensating said rate command signal for the operation of said filtering means to render the average angular rate of said second gimbaled element between computer rate command signal updates to be substantially that desired.

6. The interface system in accordance with claim 5 wherein the filtering means is coupled between the computer and first driving means and includes a single-pole low-pass filter.

7. The interface system in accordance with claim 5 wherein the generating means comprises means for effecting a signal representative of the difference between the rate command signal and filtered rate command signal, said effected signal being used as the feed-forward signal for governing the angular rate of the second gimbaled element.

8. The interface system in accordance with claim 5 wherein the compensation means includes:
   first means for computing during a present time interval between rate command signal updates a fixed rate command signal for a next time interval between rate command signal updates based on a function of the desired average angular rate of the second gimbaled element during the next time interval, the next time interval duration, the effective time constant of the filtering means, and the final value of the filtered rate command signal for the present time interval; and
   second means for computing the final value of the filtered rate command signal for the present time interval based on a function of the fixed rate command signal for the present time interval, the present time interval duration, the final value of the filtered rate command signal for a previous time interval between rate command signal updates, and the effective time constant of the filtering means.

9. The interface system in accordance with claim 5 wherein the first driving means comprises a gyro torquing circuit, and a rate-integrating gyro for driving the first gimbaled element at an angular rate therewith; and wherein the filtered rate command signal is provided to said gyro torquer for governing the movement of said first gimbaled element of said rate-integrating gyro to a desired angular rate.

10. The interface system in accordance with claim 9 wherein the second driving means comprises a power amplifier and a torque motor coupled thereto for driving the second gimbaled element at an angular rate; and wherein the rate-integrating gyro is operative to measure the integral of the difference in angular rate between the first and second gimbaled elements and for generating the signal representative thereof; and wherein said power amplifier and torque motor are governed by the representative signal and the generated feed-forward signal.

* * * * *